(12) United States Patent
Han et al.

(10) Patent No.: US 9,230,151 B2
(45) Date of Patent: Jan. 5, 2016

(54) METHOD, APPARATUS, AND SYSTEM FOR SEARCHING FOR IMAGE AND IMAGE-RELATED INFORMATION USING A FINGERPRINT OF A CAPTURED IMAGE

(75) Inventors: Se-jun Han, Daejeon (KR); Tae-jeoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1075 days.

(21) Appl. No.: 11/873,506

(22) Filed: Oct. 17, 2007

(65) Prior Publication Data

US 2008/0285890 A1 Nov. 20, 2008

(30) Foreign Application Priority Data

May 15, 2007 (KR) .................. 10-2007-0047300

(51) Int. Cl.
*G06K 9/66* (2006.01)
*G06K 9/00* (2006.01)

(52) U.S. Cl.
CPC .................. *G06K 9/00087* (2013.01)

(58) Field of Classification Search
None
See application file for complete search history.

(56) References Cited

U.S. PATENT DOCUMENTS

| 6,044,408 | A | * | 3/2000 | Engstrom et al. ............. 719/328 |
| 6,173,275 | B1 | * | 1/2001 | Caid et al. ........................ 706/14 |
| 6,181,817 | B1 | * | 1/2001 | Zabih et al. .................... 382/170 |
| 6,240,423 | B1 | * | 5/2001 | Hirata ................................. 1/1 |
| 6,522,779 | B2 | * | 2/2003 | Pass et al. ....................... 382/170 |
| 6,557,017 | B1 | * | 4/2003 | Venable ........................... 715/210 |
| 7,031,965 | B1 | * | 4/2006 | Moriya et al. ................... 386/243 |
| 7,712,123 | B2 | | 5/2010 | Miyaoku et al. |
| 7,809,154 | B2 | * | 10/2010 | Lienhart et al. ................ 382/100 |
| 7,856,144 | B2 | * | 12/2010 | Matsushita ...................... 382/190 |
| 8,073,194 | B2 | * | 12/2011 | Lienhart et al. ................ 382/100 |
| 8,150,743 | B2 | * | 4/2012 | Brown ............................. 705/27.2 |
| 8,374,387 | B2 | * | 2/2013 | Lienhart et al. ................ 382/100 |
| 8,406,462 | B2 | * | 3/2013 | Radhakrishnan et al. ..... 382/100 |
| 2001/0017940 | A1 | * | 8/2001 | Kim et al. ....................... 382/162 |

(Continued)

FOREIGN PATENT DOCUMENTS

JP 2002-334092 A 11/2002
KR 10-2005-0072344 A 7/2005

(Continued)

OTHER PUBLICATIONS

Cheung e al., Efficient video similarity measurement with video signature, 2003, IEEE Trans. Circuits Syst. Video Technol., vol. 13, No. 1, pp. 59-74.*

(Continued)

*Primary Examiner* — Matthew Bella
*Assistant Examiner* — Jason Heidemann
(74) *Attorney, Agent, or Firm* — Sughrue Mion, PLLC

(57) ABSTRACT

An apparatus, method, and system for searching for images and image-related information are described in which the image information search system includes: an image reproducing apparatus reproducing or capturing an image; and an image/information search server searching for image/information associated with the captured image. In the image and image-information search apparatus and method, a user can easily acquire his or her desired image file or image-related information while he or she is watching images, even when he or she does not know any detailed identification information associated with his or her desired image.

24 Claims, 9 Drawing Sheets

(56) References Cited

U.S. PATENT DOCUMENTS

| | | | |
|---|---|---|---|
| 2001/0028739 A1* | 10/2001 | Lee et al. | 382/165 |
| 2002/0042920 A1* | 4/2002 | Thomas et al. | 725/87 |
| 2002/0072952 A1* | 6/2002 | Hamzy et al. | 705/10 |
| 2002/0169749 A1* | 11/2002 | Kageyama et al. | 707/1 |
| 2004/0122746 A1* | 6/2004 | Charlier et al. | 705/27 |
| 2004/0243567 A1* | 12/2004 | Levy | 707/3 |
| 2005/0031315 A1* | 2/2005 | Kageyama et al. | 386/124 |
| 2006/0285824 A1* | 12/2006 | Osaki | 386/83 |
| 2007/0071290 A1* | 3/2007 | Shah et al. | 382/118 |
| 2008/0089551 A1* | 4/2008 | Heather et al. | 382/100 |
| 2008/0104011 A1* | 5/2008 | Shibasaki et al. | 707/1 |
| 2008/0226119 A1* | 9/2008 | Candelore et al. | 382/100 |
| 2008/0292189 A1* | 11/2008 | Morimoto et al. | 382/181 |
| 2008/0317278 A1* | 12/2008 | Lefebvre et al. | 382/100 |
| 2010/0111377 A1* | 5/2010 | Monroe | 382/118 |
| 2010/0161654 A1* | 6/2010 | Levy | 707/769 |
| 2012/0176220 A1* | 7/2012 | Garcia | 340/5.83 |

FOREIGN PATENT DOCUMENTS

| | | |
|---|---|---|
| KR | 10-2006-0007707 A | 1/2006 |
| KR | 10-0549124 B1 | 1/2006 |
| KR | 10-2006-0061992 A | 6/2006 |
| KR | 10-2006-0064356 A | 6/2006 |

OTHER PUBLICATIONS

Wang et al., Content-Based Image Indexing and Searching Using Daubechies' Wavelets, 1997, Int'l J. Digital Libraries, vol. 1, No. 4, pp. 311-328.*

Flickner et al., "Query by image and video content: the QBIC system", Sep. 1995, IEEE Computer, vol. 28 No. 9, pp. 23-32.*

Jia et al., Photo-to-Search: Using Camera Phones to Inquire of the Surrounding World, Proceedings of the 7th International Conference on Mobile Data Management (MDM'06), 2006, IEEE.*

Ahmad et al. Content-based image retrieval on mobile devices, In Proceedings of SPIE (Multimedia on Mobile Devices), Jan. 2005, vol. 5684, 16-20.*

Gabbouj et al., Content-based Image Retrieval for Connected Mobile Devices, 2006, In Proceedings of Second International Symposium on Communications, Control and Signal Processing (ISCCSP).*

Communication dated Feb. 26, 2013 issued by the Korean Intellectual Property Office in counterpart Korean Patent Application No. Oct. 2007-0047300.

* cited by examiner

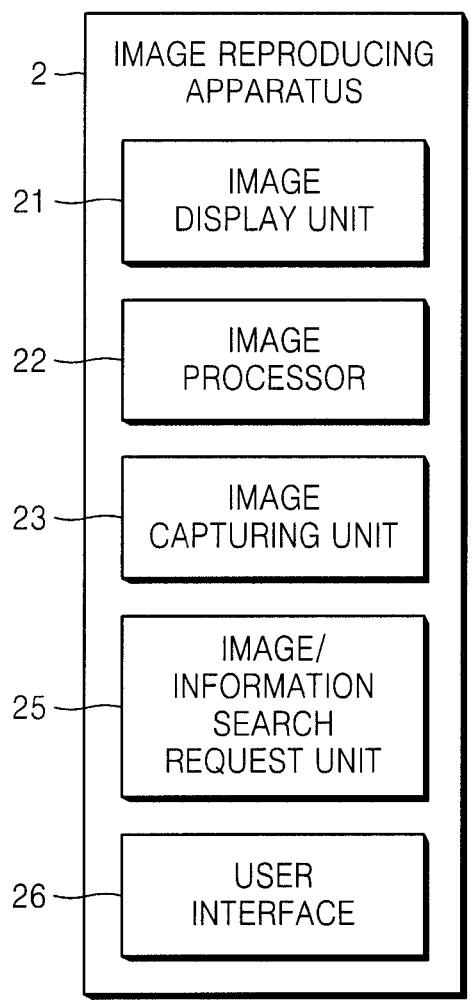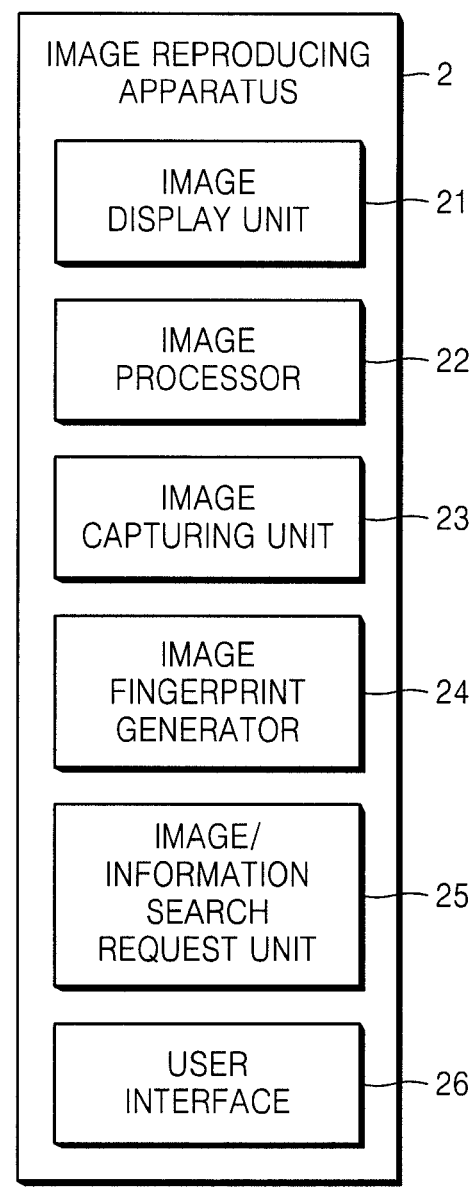

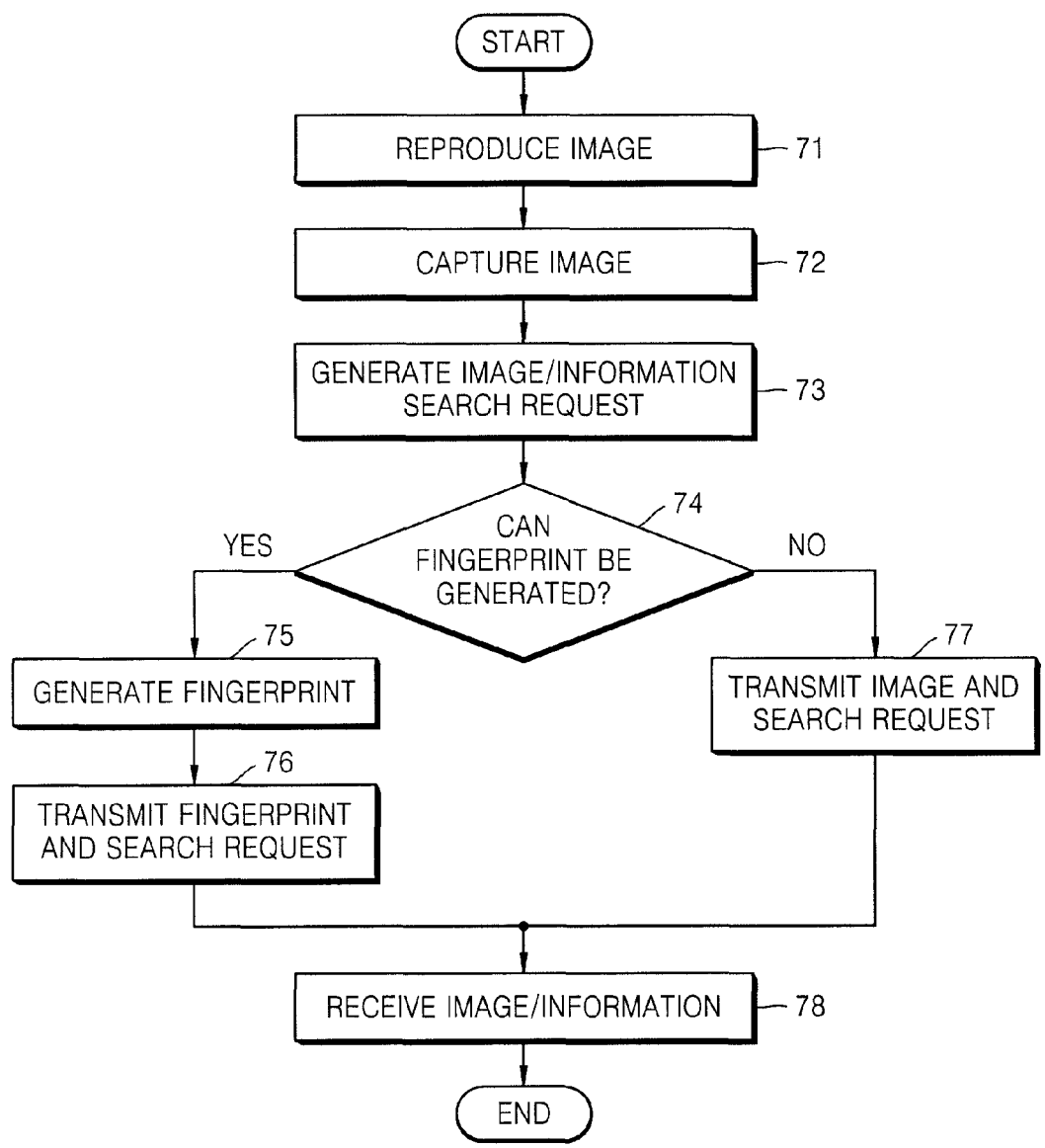

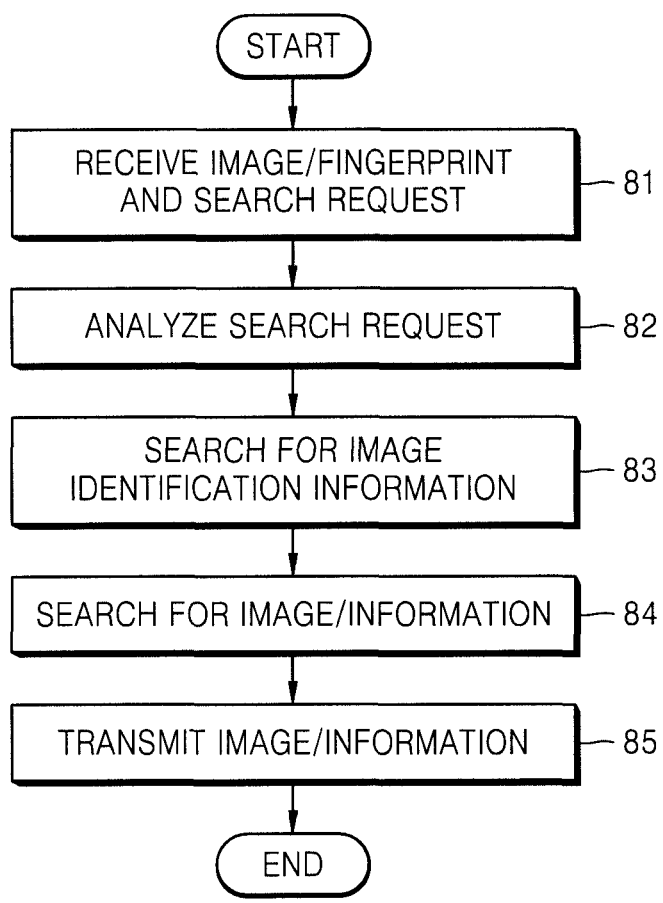

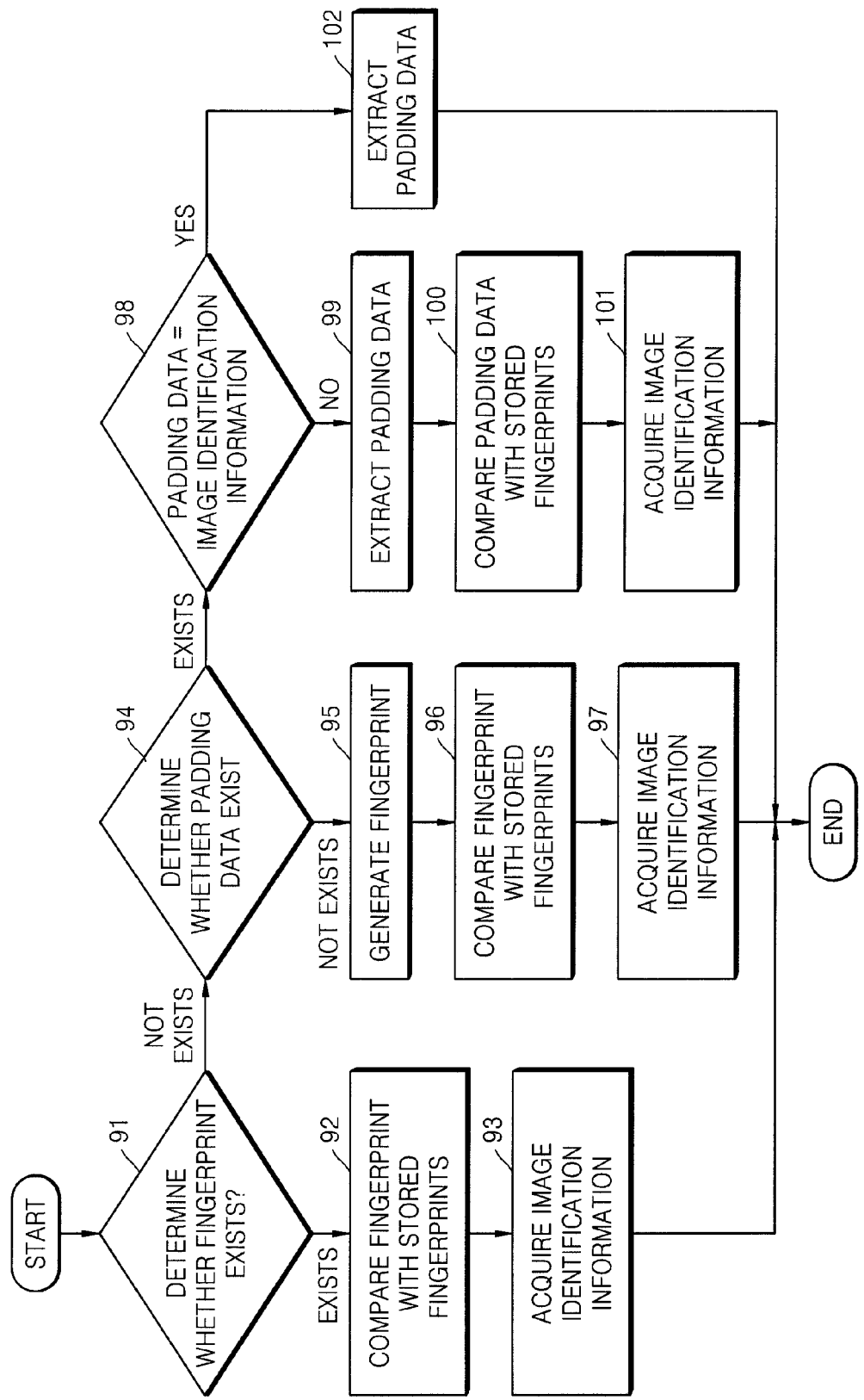

METHOD, APPARATUS, AND SYSTEM FOR SEARCHING FOR IMAGE AND IMAGE-RELATED INFORMATION USING A FINGERPRINT OF A CAPTURED IMAGE

CROSS-REFERENCE TO RELATED PATENT APPLICATION

This application claims the benefit of Korean Patent Application No. 10-2007-0047300, filed on May 15, 2007, in the Korean Intellectual Property Office, the disclosure of which is incorporated herein in its entirety by reference.

BACKGROUND OF THE INVENTION

1. Field of the Invention

The present invention relates to searching for an image and image-related information, and more particularly, to a method, apparatus, and system for searching for an image and image-related information using an image which is captured by an image reproducing apparatus.

2. Description of the Related Art

Due to the increase of video recording and reproducing apparatuses, a large amount of various still and moving image data files have been created. A representative example of a video recording and reproducing apparatus is a digital TV, and video recording and reproducing apparatuses provide a variety of services (for example, Video On Demand (VOD), etc.) through Internet moving-image providing sites (for example, YouTube). Accordingly, users can experience a huge variety of still and moving images. In some instances, users want to obtain image files or information related to the images, while watching the images.

In this case, however, the users cannot obtain their desired image file or image-related information unless they possess information (or, identification information), such as the name of a title or director, time of manufacture, distribution company, etc., which are required to search the desired image file or the image-related information.

SUMMARY OF THE INVENTION

The present invention provides a method of allowing a user to search for and obtain his or her desired image or image-related information while he or she is watching the image, without using identification information for identifying the image.

The present invention also provides an apparatus for allowing a user to search for and obtain his or her desired image or image-related information while he or she is watching the image, without using identification information for identifying the image.

According to an aspect of the present invention, there is provided an image reproducing apparatus including: an image capturing unit capturing an image; and an image/information search requesting unit generating an image/information search request for searching for image/information about the image captured by the image capturing unit.

According to another aspect of the present invention, there is provided an image/information search server including: an identification information search unit detecting identification information of a captured image; an image/information storage unit storing image/information; and an image/information search unit searching for the image/information from the image/information storage unit, with reference to the identification information, according to an image/information search request.

According to another aspect of the present invention, there is provided an image/information search service system including: an image reproducing apparatus reproducing or capturing an image; and an image/information search server searching for the image/information associated with the captured image.

According to another aspect of the present invention, there is provided an image/information search method including: receiving an image/information search request from an image reproducing apparatus; analyzing the image/information search request; searching for image identification information; and searching for image/information using the analysis result of the image/information search request and the image identification information.

According to another aspect of the present invention, there is provided a computer-readable recording medium having embodied thereon a program for executing an image/information search request method including: capturing an image which is reproduced by an image reproducing apparatus; generating an image/information search request for searching for image/information associated with the captured image; and transmitting the image/information search request to an image/information search server.

According to another aspect of the present invention, there is provided a computer-readable recording medium having embodied thereon a program for executing an image/information search method including: receiving an image/information search request from an image reproducing apparatus; analyzing the image/information search request; searching for image identification information; and searching for image/information using the analysis result of the image/information search request and the image identification information.

BRIEF DESCRIPTION OF THE DRAWINGS

The above and other features and advantages of the present invention will become more apparent by describing in detail exemplary embodiments thereof with reference to the attached drawings in which:

FIGS. 2A and 2B are block diagrams of examples of an image reproducing apparatus according to embodiments of the present invention;

FIG. 7 is a flowchart of an image/information search requesting method according to an embodiment of the present invention;

FIG. 8 is a flowchart of an image/information search method according to an embodiment of the present invention; and FIG. 9 is a detailed flowchart of operation 84 in the image/information search method of FIG. 8, according to an embodiment of the present invention.

DETAILED DESCRIPTION OF THE INVENTION

Hereinafter, both still images and moving images will be simply referred to as "images". Also, a still image file, a moving image file, or image-related information will be simply referred to as "image/information".

Figure 1:
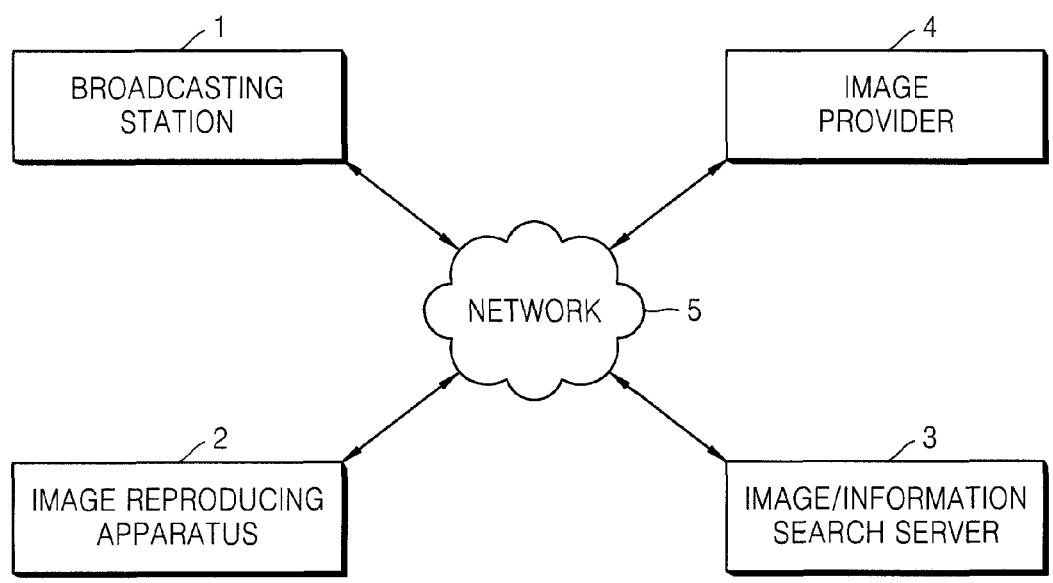
FIG. 1 is a view explaining the technical concept of an image/information search service system according to an embodiment of the present invention.

FIG. 1 is a view for explaining the technical concept of an image/information search service system according to an embodiment of the present invention.

Referring to FIG. 1, a broadcasting station 1 may be an over-the-air broadcasting station, a cable broadcasting station, an internet broadcasting station, or the like, and provides a variety of TV broadcast programs to subscribers through the airwaves or a wired/wireless network 5.

An image provider 4 may be an image providing server connected to the Internet, a multimedia content provider providing Video On Demand (VOD) services, or the like.

An image reproducing apparatus 2 may be a digital TV, a Digital Multimedia Broadcasting (DMB) receiver, a personal computer, or the like, and can be a fixed-type or portable image receiving/reproducing apparatus which can receive and reproduce images from the broadcasting station 1, or the image provider 4, through the wired/wireless network 5.

An image/information search server 3 stores a variety of multimedia content (still and moving images) and a variety of image-related information therein. If a request for image/information is received from a user (or from the image reproducing apparatus 2, the image/information search server 3 searches for the requested image/information and provides the search result to the user.

FIGS. 2A and 2B are block diagrams of examples of the image reproducing apparatus 2 according to embodiments of the present invention.

Referring to FIG. 2A, the image reproducing apparatus 2 includes an image display unit 21, an image processor 22, an image capturing unit 23, an image/information search requesting unit 25, and a user interface 26.

The image processor 22 decompresses and decodes image files.

The image display unit 21 may be a Liquid Crystal Display (LCD), and displays image data which is decoded by the image processor 22. Also, the image display unit 21 can display a menu to search for image/information.

The user interface 26 allows a user to manipulate the image reproducing apparatus 2. Specifically, when a user finds his or her desired image while watching images through the image display unit 21, he or she inputs a command through the user interface 26, thereby causing the image reproducing apparatus 2 to capture the desired image. Alternatively, the user can input an image/information search condition through the user interface 26.

The image capturing unit 23 captures an image which is currently displayed on the image display unit 21, if a capture command is received from a user.

The image/information search requesting unit 25 generates an image/information search request, on the basis of an image/information search condition received through the user interface 26, and transmits the image/information search request to the image/information search server 3.

The image reproducing apparatus 2 illustrated in FIG. 2B includes all the elements illustrated in FIG. 2A and further includes an image fingerprint generator 24. The image fingerprint generator 24 extracts a fingerprint from a captured image.

The fingerprint technique has been developed to correctly determine every second whether a captured image coincides with its original image at least in part, and which part of the image coincides if the captured image coincides with its original image, using at least a part of the captured image. The fingerprint technique can be implemented by utilizing the RGB densities of pixels of a captured still image, colors according to the composition of the captured image, etc., wherein each still image has intrinsic data. The fingerprint of the captured image that is generated by the image fingerprint generator 24 is transferred to the image/information search server 3, and used to search for image/information identification information.

Figure 3:
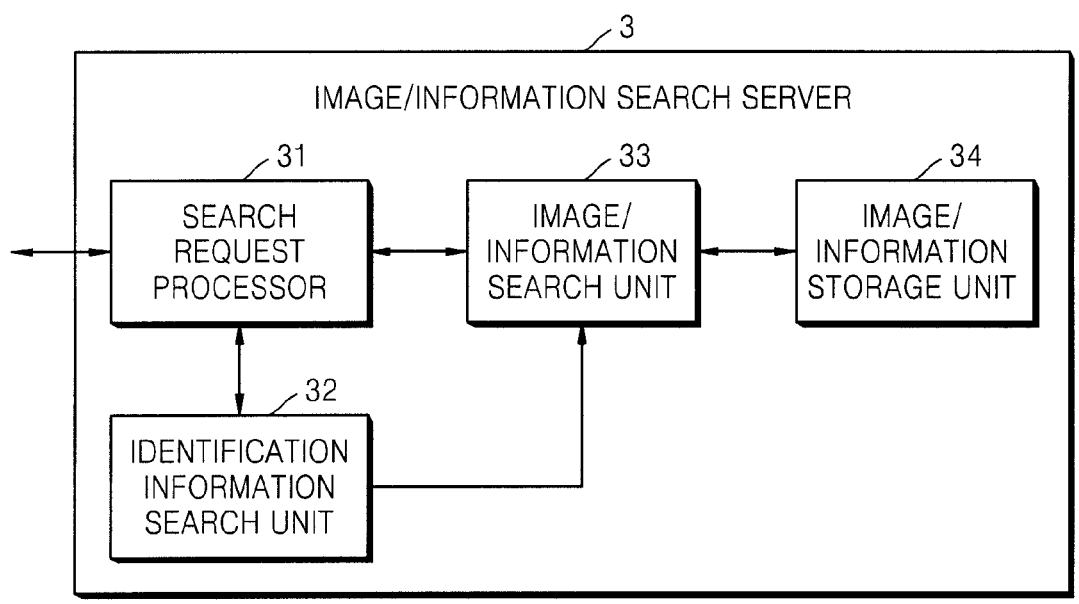
FIG. 3 is a block diagram of an image/information search server according to an embodiment of the present invention.

FIG. 3 is a block diagram of the image/information search server 3 according to an embodiment of the present invention.

Referring to FIG. 3, the image/information search server 3 includes a search request processor 31, an identification information search unit 32, an image/information search unit 33, and an image/information storage unit 34.

Figure 4:
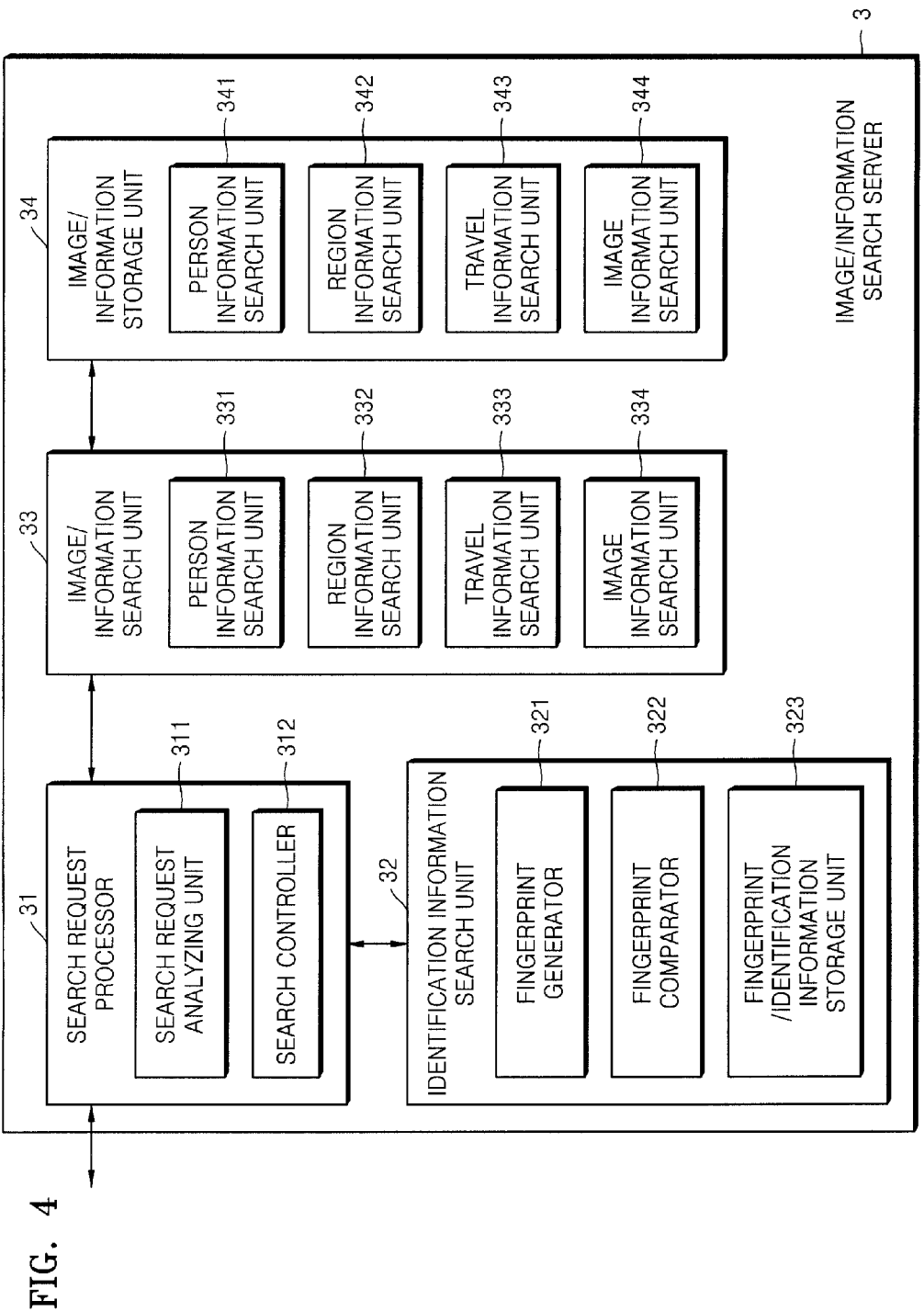
FIG. 4 is a detailed block diagram of the image/information search server illustrated in FIG. 3, according to an embodiment of the present invention.

FIG. 4 is a detailed block diagram of the image/information search server 3 illustrated in FIG. 3, according to an embodiment of the present invention.

Referring to FIG. 4, the search request processor 31 includes a search request analyzing unit 311 for analyzing an image/information search request received from the image reproducing apparatus 2, and a search controller 312 for controlling the image/information search unit 33 according to a search condition analyzed by the search request analyzing unit 311.

The image/information storage unit 34 includes a person information storage unit 341, a region information storage unit 342, a travel information storage unit 343, and an image storage unit 344.

The image storage unit 344 stores image content files, such as still or moving images, wherein the image content include pictures of people, pictures of scenery, pictures of journey/travel destinations, movies, dramas, etc.

The person information storage unit 341 stores information (for example, names, ages, personal histories, etc.) about persons or characters in portraits, movies, or dramas, which are stored in the image storage unit 344.

The region information storage unit 342 stores information (for example, countries and administrative districts) about specific regions, if images stored in the image storage unit 344 are related to the specific regions.

The travel information storage unit 343 stores information (for example, transportation, lodging, travel bureaus, etc.) about travel destinations in travel/journey destination pictures or movies, which are stored in the image storage unit 344.

Image files or information data, which are stored in the image/information storage unit 34, have intrinsic identification information (ID) that will be used for searching.

The identification information search unit 32 detects identification information of a captured image using the captured image itself or the fingerprint, both of which are received from the image reproducing apparatus 2. Referring to FIG. 4 again, the identification information search unit 32 includes a fingerprint generator 321, a fingerprint comparator 322, and a fingerprint/identification information storage unit 323.

The fingerprint generator 321 is used to extract a fingerprint from the captured image received from the image reproducing apparatus 2, and has the same function as the image fingerprint generator 24 of the image reproducing apparatus 2.

The fingerprint/identification information storage unit 323 stores fingerprints which have been previously extracted from image files stored in the image/information storage unit 34. Also, the fingerprint/identification information storage unit 323 includes identifiers of images or information stored in the image/information storage unit 34, and further includes a mapping table indicating a corresponding relationship between fingerprints and identifiers.

The fingerprint comparator 322 searches for the fingerprint of the captured image generated by the fingerprint generator 321 from the fingerprint/identification information storage unit 323, detects a fingerprint which is equal to or similar to the fingerprint of the captured image, and then detects an identifier corresponding to the detected fingerprint using the mapping table.

Referring to FIG. 4 again, the image/information search unit 33 includes a person information search unit 331, a region information search unit 332, a travel information search unit 333, and an image search unit 334.

The person information search unit 331, the region information search unit 332, the travel information search unit 333, and the image search unit 334 search for information about a user's desired image file from the person information storage unit 341, the region information storage unit 342, the travel information storage unit 343, and the image storage unit 344, according to a command received from the search controller 312. The search operation can be performed using an identifier which is acquired by the identification information search unit 32.

Figure 5A:
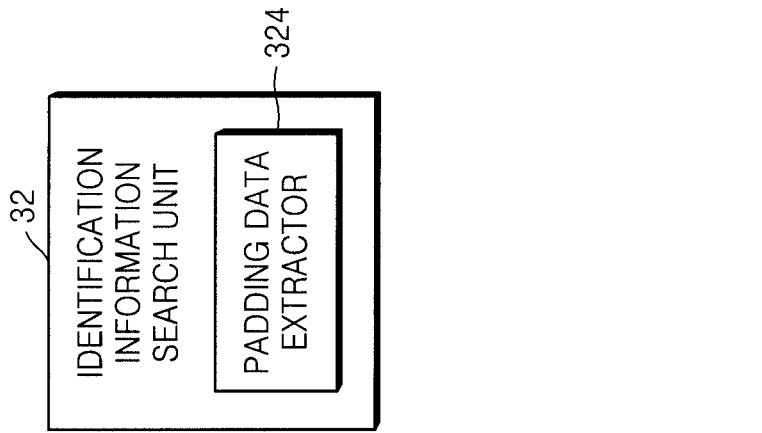
FIGS. 5A to 5C are block diagrams illustrating examples of an identification information search unit included in the image/information search server illustrated in FIG. 3, according to embodiments of the present invention.
Figure 5B:
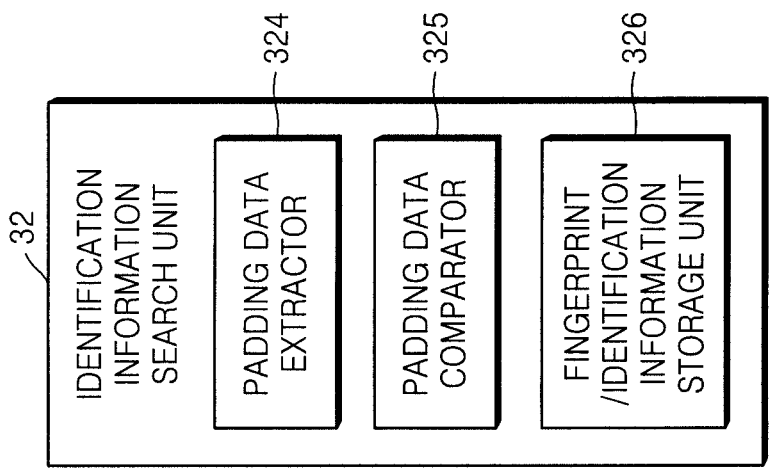
Figure 5C:
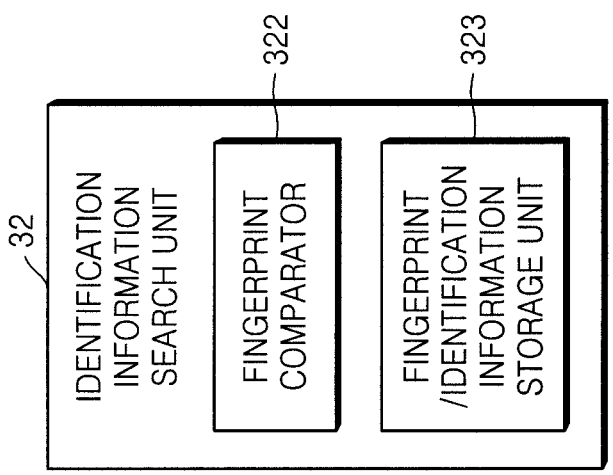

FIGS. 5A to 5C are block diagrams illustrating examples of the identification information search unit 32 of the image/information search server 3 illustrated in FIG. 3, according to embodiments of the present invention.

In FIG. 5A, the identification information search unit 32 does not have the fingerprint generator 321, unlike the identification information search unit 32 illustrated in FIG. 4. The identification information search unit 32 illustrated in FIG. 5A can be applied to a case where the image reproducing apparatus 2 includes the image fingerprint generator 24.

In FIG. 5B, the identification information search unit 32 includes a padding data extractor 324, a padding data comparator 325, and a padding data/identification information storage unit 326.

Generally, an image file may include image data, and additional information (for example, a name, a genre, a file length, an entire reproduction time, an intrinsic identifier (ID), etc.) about the corresponding image in padding data. The additional image data is called "Media Information" in the MPEG standard.

The padding data extractor 324 extracts additional information (for example, a name, a genre, a file length, an entire reproduction time, an intrinsic identifier (ID), etc.) from a received captured image.

The padding data/identification information storage unit 326 stores data associated with images stored in the image/information storage unit 34. Also, the padding data/identification information storage unit 326 includes identifiers (IDs) of images or information stored in the image/information storage unit 34, and further includes a mapping table indicating a corresponding relationship between the extracted image-related information and the identifiers.

The padding data comparison unit 325 compares the additional information extracted by the padding data extractor 324, with image-related information stored in the padding data/identification information storage unit 326, searches for image-related information according to the comparison result, and detects an identifier corresponding to the image-related information using the mapping table. The identification information search unit 32 of FIG. 5C includes just the padding data extractor 324 and is provided to search for identification information using padding data.

Comparing the identification information search unit 32 illustrated in FIG. 5C with the identification information search unit 32 illustrated in FIG. 5B, the identification information search unit 32 illustrated in FIG. 5C does not include the padding data comparator 325 and the padding data identification information storage unit 326.

The identification information search unit 32 illustrated in FIG. 5C can be applied to a case where searching of additional identification information is not needed since image-related information extracted by the padding data extractor 324 is an identifier itself.

FIG. 7 is a flowchart of an image/information search request method according to an embodiment of the present invention.

The image/information search request method is performed by a user through the image reproducing apparatus 2 illustrated in FIG. 2.

Figure 6A:
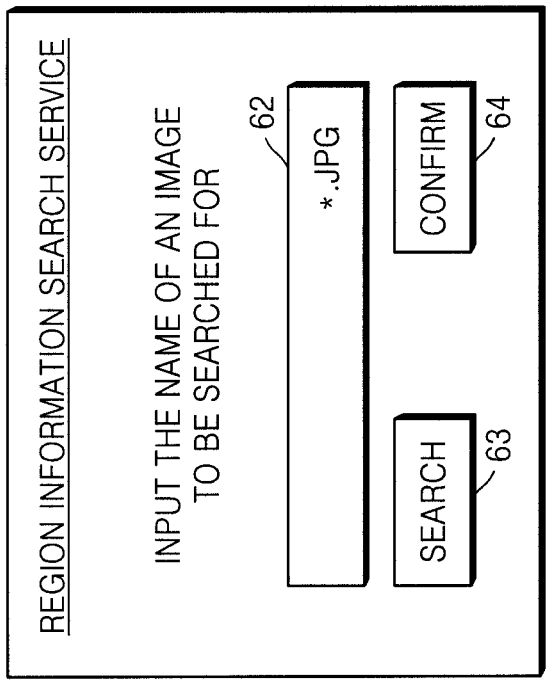
FIGS. 6A and 6B illustrate a Graphic User Interface (GUI) of a search service, which is displayed on an image display unit of the image reproducing apparatus illustrated in FIG. 2, according to embodiments of the present invention.
Figure 6B:

FIGS. 6A and 6B illustrate a Graphic User Interface (GUI) of search service, which is displayed on an image display unit of the image reproducing apparatus illustrated in FIG. 2, according to embodiments of the present invention;

Referring to FIGS. 1, 2, 6, and 7, first, the image reproducing apparatus 2 reproduces still or moving images received from the broadcasting station 1 or the image provider 4 (operation 71), and a user captures his or her desired image from the still or moving images that he or she is watching (operation 72).

Then, the user issues a request for searching for image/information associated with the captured image (operation 73).

For example, if the user selects an image/information search function from a menu which is provided by the image reproducing apparatus 2, a Graphic User Interface (GUI) for allowing the user to select his or her desired search service is displayed on the image display unit 21 of the image reproducing apparatus 2. Referring to FIG. 6, if the user selects a "region information search" service 61 through the GUI, a new GUI for helping the user to input his or her desired image file name is displayed on the image display unit 21. The user can directly input his or her desired image file name on an input window 62, or selects his or her desired image file using a "search" menu 63. Then, if the user presses a "confirm" button 64, an image/information search request is generated.

Then, it is determined whether the image reproducing apparatus 2 can generate a fingerprint (or whether the image reproducing apparatus 2 includes the image fingerprint generator 24) (operation 74).

If the image reproducing apparatus 2 can generate a fingerprint, the image reproducing apparatus 2 generates a fingerprint of the captured image (operation 75).

Then, the image reproducing apparatus 2 transmits the image/information search request together with the fingerprint of the captured image, to the image/information search server 3 (operation 76).

However, if the image reproducing apparatus 2 cannot generate a fingerprint, the image reproducing apparatus 2 transmits the captured image and the image/information search request to the image/information search server 3 (operation 77).

Then, the image reproducing apparatus 2 receives the result of the image/information searching from the image/information search server 3 (operation 78).

According to another embodiment of the present invention, operations 72 and 73 can be performed in reverse order.

That is, if a user issues an image/information search request for searching for an image which he or she is watching while the image reproducing apparatus 2 is reproducing the image, the image reproducing apparatus 2 automatically captures the image which is currently reproduced, and transmits the captured image and the image/information search request to the image/information search server 3.

FIG. 8 is a flowchart of an image/information search method according to an embodiment of the present invention.

The image/information search method according to the current embodiment of the present invention is performed by the image/information search server 3 illustrated in FIG. 1.

First, the image/information search server 3 receives an image/information search request together with a captured image file or a fingerprint of a captured image (hereinafter, an "image/fingerprint"), from the image reproducing apparatus 2 (operation 81), and then analyzes the image/information search request (operation 82).

Then, identification information of the captured image using the image/fingerprint received in operation 81 is searched for (operation 83). The searching of the identification information will be described in detail later with reference to FIG. 9.

Then, the image/information storage unit 34 detects the corresponding image/information, using the image/information search request analyzed in operation 82 and the identification information searched in operation 83 (operation 84).

The image/information search server 3 transmits the image/information detected in operation 84 to the image reproducing apparatus 2.

According to another embodiment of the present invention, operations 82 and 83 can be performed in reverse order.

FIG. 9 is a detailed flowchart of operation 84 for searching for the image/information, according to an embodiment of the present invention.

Referring to FIG. 9, in operation 91, it is determined whether a fingerprint of an image is included in image data received from the image reproducing apparatus 2.

If a fingerprint of an image is included in image data received from the image reproducing apparatus 2, the fingerprint is compared with fingerprints stored in the fingerprint/identification information storage unit 323 (operation 92), thereby obtaining identification information (for example, an identifier) of the image (operation 93).

However, if no fingerprint is included in the data received from the image reproducing apparatus 2, the image/information search server 3 acquires image identification information using the image received from the image reproducing apparatus 2, as follows.

First, it is determined whether padding data is included in the received image (operation 94). If no padding data is included in the received image, a fingerprint is generated from the received image (operation 95).

Then, the generated fingerprint is compared with fingerprints stored in fingerprint/identification information storage unit 323 and image identification information is acquired (operations 96 and 97). Operations 96 and 97 are the same as operations 92 and 93.

If padding data is included in the received image, image identification information is acquired using the padding data.

First, padding data is extracted from the received image (operation 99). The padding data is compared with padding data stored in the padding data/identification information storage unit 326, and it is determined whether the extracted padding data is equal to some of the padding data stored in the padding data/identification information storage unit 326 (operation 100). Then, if the extracted padding data is equal to some of the padding data stored in the padding data/identification information storage unit 326, image identification information corresponding to the padding data is acquired (operation 101).

If the extracted padding data is image identification information (for example, an identifier), operations 100 and 101 are omitted (operation 102).

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, in an image and image-related information search apparatus and method according to the present invention, a user can easily acquire his or her desired image file or image-related information while he or she is watching images, when he or she does not know any detailed identification information associated with his or her desired image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image reproducing apparatus comprising:
   an image capturing unit for capturing an image;
   a communicator for transmitting a request for image or information associated with the captured image to a server; and
   a controller for determining whether the image reproducing apparatus is able to generate a fingerprint of the captured image, and if it is determined that the image reproducing apparatus is able to generate the fingerprint of the captured image, the image reproducing apparatus extracts the fingerprint of the captured image from the captured image and transmits the fingerprint of the captured image to a server without transmitting the captured image to the server, and if it is determined that the image reproducing apparatus is not able to generate the fingerprint, the image reproducing apparatus transmits a request for an image, including the captured image or information associated with the captured image to the server.

2. The apparatus of claim 1, wherein the apparatus transmits the request to the server.

3. The apparatus of claim 1, wherein the captured image comprises padding data.

4. The image reproducing apparatus of claim 1, wherein the fingerprint is used in the server to search the image/information about the captured image by comparing the fingerprint of the captured image with other fingerprints in the server.

5. An image/information search server comprising:
an identification information search unit detecting identification information of an image captured by an image reproducing apparatus;
an image/information storage unit storing image/information; and
an image/information search unit searching for the image/information from the image/information storage unit, with reference to the identification information, according to an image/information search request,
wherein the identification information search unit detects the identification information of the captured image by using a fingerprint of the captured image or padding data,
wherein the image/information search server determines whether data received from the image reproducing apparatus includes the fingerprint,
if it is determined that data received from the image reproducing apparatus includes the fingerprint, obtains the identification information of the image using the fingerprint, and
if it is determined that data received from the image reproducing apparatus does not includes the fingerprint, obtains the identification information of the image using the padding data.

6. The image/information search server of claim 5, wherein the server further comprises an image/information search request processing unit analyzing the image/information search request.

7. The image/information search server of claim 6, wherein the image/information search request processing unit comprises an image/information search request analyzing unit and a search control unit.

8. The image/information search server of claim 5, wherein the identification information search unit comprises a fingerprint comparison unit and a fingerprint/identification information storage unit.

9. The image/information search server of claim 8, wherein the server further comprises a fingerprint generating unit.

10. The image/information search server of claim 5, wherein the identification information search unit comprises a padding data extracting unit.

11. The image/information search server of claim 10, wherein the identification information search unit further comprises a padding data comparison unit and a padding data/identification information storage unit.

12. The image/information search server of claim 5, wherein the image/information storage unit comprises one or more of a person information storage unit, a region information storage unit, a travel information storage unit, and an image storage unit.

13. The search service system of claim 5, wherein the identification information search unit detects the identification information of the captured image by comparing the fingerprint of the captured image with fingerprints of images, the images being stored in the image/information storage units.

14. The search service system of claim 5, wherein the fingerprint of the captured image is received from the image reproducing apparatus or is generated in the image/information search server.

15. An image/information search service system comprising:
an image reproducing apparatus reproducing an image; and
an image/information search server searching for image/information associated with the image,
wherein the image reproducing apparatus comprises:
an image capturing unit capturing the image; and
a communicator for transmitting a request for image or information associated with the captured image to a server; and
a controller for determining whether the image reproducing apparatus is able to generate a fingerprint of the captured image, and if it is determined that the image reproducing apparatus is able to generate the fingerprint of the captured image, the image reproducing apparatus extracts the fingerprint of the captured image from the captured image and transmits the fingerprint of the captured image to a server without transmitting the captured image to the server, and if it is determined that the image reproducing apparatus is not able to generate the fingerprint of the captured image, the image reproducing apparatus transmits a request for an image, including the captured image, or information associated with the captured image to the server.

16. An image/information search request method comprising:
capturing an image which is reproduced by an image reproducing apparatus;
generating an image/information search request for searching for image/information associated with the captured image;
determining whether the image reproducing apparatus is able to generate a fingerprint;
transmitting the image/information search request to an server,
wherein the method further comprises extracting the fingerprint of the captured image from the captured image and transmitting the fingerprint to the server if it is determined that the image reproducing apparatus is able to generate the fingerprint, and transmitting the captured image to the server if it is determined that the image reproducing apparatus is not able to generate the fingerprint.

17. The image/information search request method of claim 16, wherein the fingerprint is used in the server to search the image/information about the captured image by comparing the fingerprint of the captured image with other fingerprints in the server.

18. An image/information search method comprising:
receiving, from an image reproducing apparatus, an image/information search request for image/information associated with an image captured by the image reproducing apparatus;
analyzing the image/information search request;
detecting image identification information of the captured image; and
searching for image/information using the analysis result of the image/information search request and the image identification information,
wherein the detecting the image identification information of the captured image comprises:
determining whether data received from the image reproducing apparatus includes a fingerprint of the captured image,
obtaining the identification information of the image using the fingerprint if it is determined that the received data includes the fingerprint,
determining whether the received data includes padding data if it is determined that the received data does not include the fingerprint, and generating a fingerprint from the received data and searching for the identification information using the generated fingerprint if it is determined that the received data does not include the padding data.

19. The method of claim 18, further comprising receiving at least one of the captured image and the fingerprint of the captured image from the image reproducing apparatus.

20. The method of claim 19, wherein the detecting of the image identification information comprises comparing the fingerprint of the captured image with stored image fingerprints, and acquiring image identification information according to the comparison result.

21. The method of claim 19, wherein the detecting of the image identification information further comprises extracting padding data from the received image.

22. The method of claim 21, wherein the padding data includes at least one of a name, a genre, a file length, an entire reproduction time, and an intrinsic identifier (ID).

23. The method of claim 21, wherein the detecting of the image identification information comprises comparing the extracted padding data with stored padding data and acquiring the image identification information according to the comparison result.

24. The method of claim 18, wherein the image/information search request includes at least one of a person information search request, a region information search request, a travel information search request, and an image search request.

* * * * *